Patented June 12, 1928.

1,672,895

UNITED STATES PATENT OFFICE.

PROSPER JEAN AUGUSTE MAIGNEN, OF PHILADELPHIA, PENNSYLVANIA.

PREPARATION OF CELLULOSE.

No Drawing. Application filed July 2, 1924. Serial No. 723,686.

My invention relates to the preparation of cellulose from fibrous vegetable matter.

The fibrous tissues of plants from which paper, paperboard, celluloid, smokeless powder, viscose, textile fibers, and various other commodities are made or can be made, consist of a skeleton structure of fibers and cells, generally known as "cellulose," and of various ingredients or compounds known generally as "non-cellulose" or lignone and variously termed impurities, soluble derivatives, fatty and waxy bodies, gums and resins, organic compounds, extractive matter, incrusting materials, etc.

To render plant-tissues available for making paper, straw board, wood board, etc., and for certain other purposes, it is necessary to dissociate or separate the non-cellulose from the cellulose.

In the preparation of plant-tissues for the above purposes, various processes are used which are not altogether satisfactory. Thus, for instance, when straw is treated with lime, the incrusting material is not sufficiently separated from the cellulose, particularly in the knots, and the resulting fiber is comparatively hard and brittle. When flax straw and esparto grass are treated with caustic soda, the fibers are liable to be gelatinized.

Such processes of the prior art are carried on in containers known as rotaries, digesters, or cookers. The aqueous alkaline solution and the material to be treated are introduced in the cooker; high pressure steam is turned on, and cooking begins.

When the material to be treated is of the nature of straw or grass which is bulky, it cannot be introduced all at once. Therefore, it has to be put in the cooker in separate batches. If the aqueous alkaline solution be made with caustic soda, the first batch is more highly digested than the successive batches. The problem of even digestion for the whole charge has not been solved hitherto. A better digestion is one of the improvements brought about by my process.

The non-cellulose matter includes certain ingredients, starches, sugars, soluble gums, tannin, and coloring matter which are easily hydrolyzed by weak alkaline solutions; and certain other ingredients—resins, fats, waxes, certain gums, pectose, etc.—which yield only to strong alkaline solutions. Therefore, it is not economical, nor in any other way advisable, to use the same strong alkaline solution for these two different kinds of constituents, as is the ordinary practice.

I obtain the desirable degree of alkalinity for these two different classes of non-cellulose ingredients by progressively preparing the alkaline reagent, sodium hydroxide, in the cooker; instead of buying it ready-made on the market, or making it at the mill, before placing it in the cooker, which requires a special causticizing apparatus.

For instance, I find it convenient to mix the reagents to make the sodium hydroxide in the cooker, by first mixing and preferably sieving together, in dry powdered form, calcium hydrate (water slacked lime) and sodium carbonate (soda ash). I then make a dense colloidal emulsion from said dry mixed chemicals by introducing them into a small quantity of hot water, but sufficient to enable the mixture to flow into a larger volume or stream of cold water on its way to the cooker. Of course, the cold water restrains the reactionary tendencies of said mixture, and such restraining action is enhanced by the low temperature of the material with which the diluted emulsion comes in contact in the cooker. However, when heat is applied, the reactionary tendencies of the mixture are gradually released from such restraint and reaction progresses in proportion to the amount of heat and the time during which it is applied. That is to say; the reagent sodium hydroxide is thus progressively formed in the cooker by the progressive reaction of calcium hydrate and sodium carbonate, until the maximum quantity producible by such reaction is formed. Consequently, the sodium hydroxide strength of the solution in the cooker is thus gradually increased by such reaction until the maximum effect thereof is attained and, thereafter, the strength increases as the solution is concentrated by the boiling off of the water vapor from said solution of sodium hydroxide in the cooker.

The preparation of the alkaline reagent in the cooker saves overhead charges and sundry other expenses, as compared with the use of the previously-made reagent.

The preparing of the reagent, sodium hydroxide, in the cooker provides a weak alkaline solution for the hydrolyzation of the more readily hydrolyzable constituents at the beginning of the cooking operation and a stronger solution for the hydrolyzation of the less readily hydrolyzable constituents as the cooking operation proceeds. Furthermore, the action of the nascent and progressively developed reagent, sodium hydroxide, is effective in producing the separation of the non-cellulose from the cellulose without acting injuriously on the one or the other.

The process is applicable to the most delicate fibers such as those of green grass, straw, esparto, weeds, wood fiber, pine needles and, in general, to every kind of plant-tissue which it may be desirable to treat for the separation of the non-cellulose material from the cellulose fiber for any purpose whatsoever.

The chemicals which I prefer to use for making the alkaline reagent in the cooker are sodium carbonate and calcium hydrate, together, for the formation of sodium hydrate. I prefer to use this formula for the more or less delicate plant-tissues, such as grasses, straw and the like.

For the treatment of the harder plant-tissues, as ground wood, I prefer to use caustic soda and caustic lime, together, to make in the cooker the product known as "soda-lime."

I, however, may use the one or the other for all kinds of plant-tissues.

The chemicals used to make the reagent in the cooker are preferably mixed in substantially equal parts, but may be mixed in any desired proportion, and applied in any desired quantity, according to the nature of the plant-tissue to be treated and according to the period of cooking desired.

My process may be carried on with the present paper-mill equipment—in rotaries, cylindrical digesters, or any other closed cooker with steam pressure; or it may be effected in open tanks heated with steam pipes or live steam.

Among the advantages of my invention are the following:

The net cost of the chemicals used to make the reagent, sodium hydroxide, in the cooker is almost negligible, because no great expense is entailed in the preparation and, more particularly, because the lime and the soda have fertilizing values, which are recovered for the greater part in combination or mixed with the organic and inorganic constituents of the non-cellulose solute. Such solute by-product of my treatment of plant tissues, as aforesaid, has a considerable value as fertilizing material, as may be seen by the following analysis of a semi-fluid sample of such solute, resulting from the treatment of straw:

| | Per cent. |
|---|---|
| Moisture | 45.49 |
| Nitrogen (calculated as $NH_3$) | 0.86 |
| Phosphoric acid (calculated as $P_2O_5$) | 0.14 |
| Potash (calculated as $K_2O$) | 1.85 |
| Sodium (calculated as $Na_2O$) | 7.15 |
| Calcium (calculated as $CaO$) | 1.21 |
| Other ingredients, including gums, resins, waxes, sugars, fats, tannin, silicates, etc. | 43.3 |

In the operations of the prior art the chemicals and the organic compounds are lost or wasted and often create serious nuisances, whereas, according to my process, they are recovered as valuable by-products.

Therefore, I do not desire to limit myself to the precise details of procedure herein set forth, as it is obvious that various modifications may be made therein without departing from the essential features of my invention, as defined in the following claim.

I claim:

A method of treating plant tissues in a cooker, for the purpose of separating the cellulose from the non-cellulose constituents thereof without impairment of the value of the latter for plant fertilizing purposes; by subjecting raw material to the progressive action of a solution of sodium hydrate, progressively generated in the cooker from a mixture of substantially equal parts of sodium carbonate and calcium hydrate in water, while maintaining the mass at atmospheric pressure; the reaction of said chemicals being progressively continued in the presence of such tissues; and separating the non-cellulose constituents from the cellulose with said chemicals and the residues of the reaction thereof; the solution thus removed being characterized by beneficial action upon plants, and the cellulose thus treated being in condition for use in the manufacture of paper.

In testimony whereof, I have hereunto signed my name at Philadelphia, Pennsylvania, this thirtieth day of June, 1924.

PROSPER JEAN AUGUSTE MAIGNEN.